Aug. 15, 1967 R. E. JOHNSON ET AL 3,336,571

UNDERWATER ACOUSTIC SIGNALING SYSTEM

Filed May 19, 1965

3 Sheets-Sheet 1

ROWLAND E. JOHNSON
HENRY J. KAY
INVENTOR.

BY Earl F. Kotts
ATTORNEY

[signature]
AGENT

ROWLAND E. JOHNSON
HENRY J. KAY
INVENTOR.

BY [signature]
ATTORNEY
[signature]
AGENT

Aug. 15, 1967 R. E. JOHNSON ET AL 3,336,571

UNDERWATER ACOUSTIC SIGNALING SYSTEM

Filed May 19, 1965

3 Sheets-Sheet 3

ROWLAND E. JOHNSON
HENRY J. KAY
INVENTOR.

BY Earl F. Kotts
ATTORNEY
Nicolaas Oelvang
AGENT

United States Patent Office 3,336,571

Patented Aug. 15, 1967

3,336,571

UNDERWATER ACOUSTIC SIGNALING SYSTEM

Rowland E. Johnson and Henry J. Kay, San Diego, Calif., assignors to General Dynamics Corporation, San Diego, Calif., a corporation of Delaware Filed May 19, 1965, Ser. No. 457,024
7 Claims. (Cl. 340—5)

ABSTRACT OF THE DISCLOSURE

A system for the transmission and reception of coded messages underwater having a transmitter which generates both signals carrying information and signals carrying no information or meaning and a receiver which employs an automatic gain control, the set level of which control is maintained between transmissions of information signals by the signals carrying no information, thereby reducing the likelihood of the misinterpretation of spurious signals. The receiver further employs a shift register which stores the information transmitted, a recognition circuit which detects the presence of a complete coded message, and a utilization device activated by the recognition circuit.

The present invention also generally relates to the signaling apparatus of copending U.S. patent applications Ser. Nos. 343,064, filed Feb. 6, 1964, now Patent No. 3,289,152 and 444,159.

Acoustic signaling system communicating via naturally noisy and dissipative media, such as those of the above mentioned applications, are commonly provided with automatic amplification or gain control means whereby any signal above a threshold value of intensity is amplified to some fixed value of intensity. Such systems, in the absence of strong meaningful signals, achieve maximum amplification, thereby amplifying ambient noises and other meaningless signals of approximately the same intensity as meaningful signals. Thus meaningful and meaningless signals are mingled in a random manner, reducing the system's capability to achieve meaningful communication.

The signaling apparatus of the present invention provides for the generation and reception of meaningful and meaningless signals of substantially equal intensity. The signals are so intermingled that every meaningful signal is preceded by an equally intense meaningless signal which has the sole purpose of providing the receiver with a sample of the intensity of an expected meaningful signal, so that the meaningful signal is accepted while a spurious or unwanted signal of lesser intensity than the sample signal is rejected by the receiver. It is essential to the practice of the invention that once the message transmission has started that there be a substantially continuous emission of constant intensity signals, meaningful or meaningless, until the message is complete. This causes the receiver to remain receptive to signals of a predetermined intensity thereby greatly reducing the reception of spurious signals.

In addition, the present invention provides for so controlling the receiver so that it is capable of receiving and storing an apparently meaningful signal only during the brief interval when a meaningful signal, next in succession in the message format, is received and is non-receptive thereafter until such time as the next succeeding signal is expected. This greatly reduces the system's response to random interfering signals.

Accordingly, it is an object of the present invention to generate meaningful and meaningless signals in a non-random manner in order that meaningless signals may be rejected and communication achieved.

It is a further object of the present invention to provide means by which a valid message may not be accidentally generated by the repetition of a non-valid message.

It is an additional object of the present invention to permit the selection of one or more of a group of possible responses while minimizing the risk that any response be initiated unintentionally.

These and various other objects and features of the invention will be more clearly understood from the reading of the detailed description in conjunction with the drawings, in which.

Figure 1:
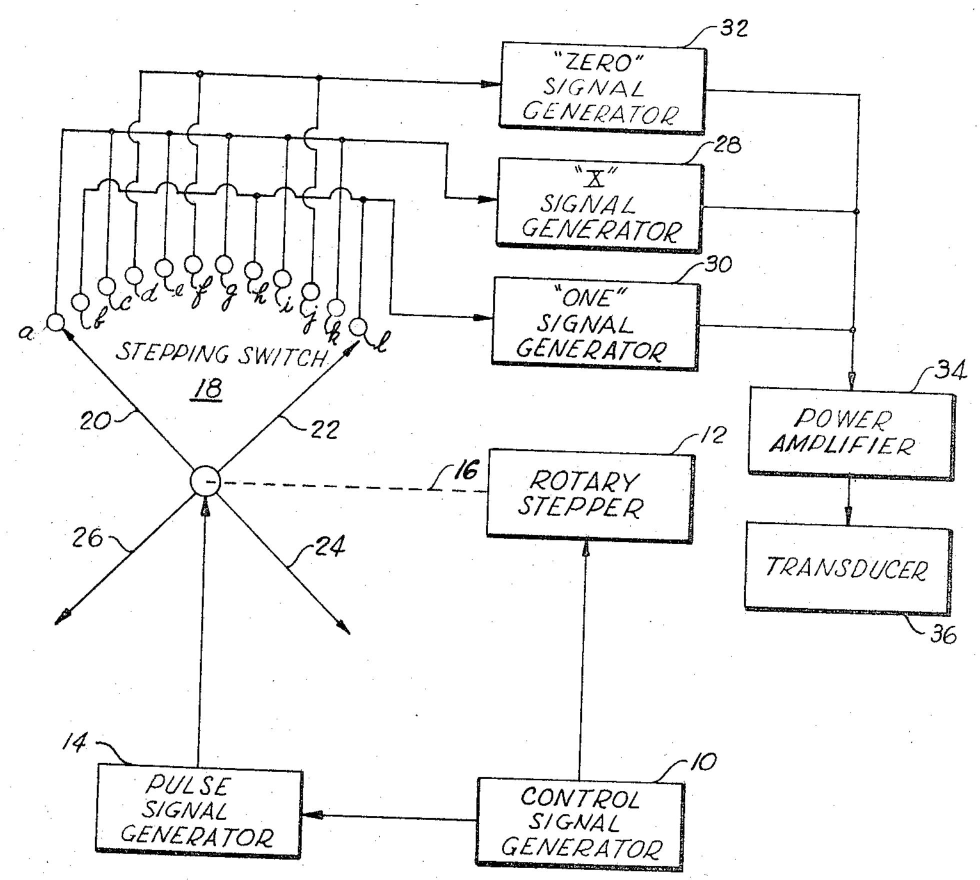
FIGURE 1 is a part block diagram and part pictorial showing of the transmitter portion of the signaling system of the present invention.

Referring to FIGURE 1 there is shown the transmitter or coder of the present invention which is constructed and arranged to generate and transmit, for example, the binary coded message 100101. The numeral 10 designates a control generator which is connected to a rotary stepper 12 and a pulse signal generator 14. The rotary stepper 12 is mechanically connected by means of connection 16 to a stepping switch arrangement 18.

The control signal generator 10 and the signal generator 14 can be conventional multivibrators. The generator 10 is adapted to generate a series of "On" and "Off" signals, and the generator 14 generates a series of actuation pulses, as will hereinafter be more fully described.

The stepping switch arrangement 18 consists of a plurality of rotary switch arms 20, 22, 24, and 26 which are electrically connected to the generator 14. The stepping switch 18 is also provided with contacts designated *a–l* which are adapted to engage the rotary switch arms. As shown, contacts *a*, *c*, *e*, *g*, *i*, and *k* are connected in parallel to an X signal generator 28. The contacts *b*, *h*, and *l* are connected to a "One" signal generator 30. The remaining contacts *d*, *f*, and *j* are connected to a "Zero" signal generator 32.

The generators 28, 30, and 32 are such as to develop signals having frequencies $f_x$, $f_1$, and $f_0$ in their respective outputs when individually actuated by pulse signals from the timing generator 14. The frequencies $f_x$, $f_1$, and $f_0$ constitute a band of frequencies ranging from a lower frequency $f_0$ through an intermediate frequency $f_x$ to an upper frequency $f_1$. The frequencies $f_0$, $f_x$, and $f_1$ can be 10,000 c.p.s., 10,300 c.p.s., and 10,600 c.p.s., respectively in the binary application illustrated. These frequencies are merely illustrative and it will be appreciated that other frequencies can be employed to practice the invention.

The outputs of signal generators 28, 30, and 32 are connected in parallel to the input of a power amplifier 34. The power amplifier is connected to a transducer 36, which couples the transmitter to the communication medium.

The operation of the transmitter of FIGURE 1 can best be described by reference to FIGURE 2 which shows various waveforms to be found in different parts of the transmitter circuit. Generation of the message is started by the control signal generator 10 which is adapted to produce a series of "On" and "Off" signals, shown as the waveform A in FIGURE 2, there being $2n$ "On" signals to generate a meaningful code word of $n$ digits. The "On" and "Off" time durations are designated $t_1$ and $t_2$, respectively, and are substantially equal in length.

Let it be assumed that just prior to the beginning of a message transmission, one of the rotary switch arms 20, for example, is at contact *a*, as shown in FIGURE 1. This places the generator 14 in electrical connection with the X generator 28. At the first "On" pulse 38 the generator 14 is turned on and produces a pulse 40 such as shown in the waveform designated B which has a duration $t_3=t_1+t_2-\Delta t$. The time interval $\Delta t$ allows for instrumental errors in $t_1$, $t_2$, and $t_3$, but is so short that the automatic gain control of the receiver, to be more fully described later, is unable to substantially change the receiver amplification during the time interval $\Delta t$. The pulse 40 turns on the X generator 28 for a time $t_3$ to generate in its output a signal 42 of acoustic energy of frequency $f_x$, as shown in the waveform designated C.

At the next "On" pulse 44 the switch arm 20 moves to contact *b* whereupon the "One" generator 30 is energized by a signal 43 from generator 14 to produce a signal 46 of frequency $f_1$, as shown in waveform C.

With the generation of a third "On" pulse 48 the switch arm 20 moves to contact *c* to again cause actuation of the X generator 28 by a pulse 49 from generator 14 to produce a frequency $f_x$ signal 50 of acoustic energy of duration $t_3$.

Upon the generation of still a fourth "On" pulse 52 the switch arm 20 moves to contact *d*. In like manner the "Zero" generator 32 is actuated by a pulse 54 from the generator 14 to produce a frequency $f_0$ energy signal 56 as shown in waveform C.

In a similar manner signal generation continues and in the example illustrated, the sequence of signals produced is X1X0X0X1X0X1. At the end of the sequence the switch arm 20 rests on contact *l* and the next arm 26 is not yet on contact *a*. After completing $2n$ pulses the control generator 10 remains quiescent for a time $t_4$ and then starts and generates another series of $2n$ pulses, thus repeating the transmission of the code word 100101. It is evident that an interval T between the starts of two successive code words having *n* digits is equal to $2nt_1+(2n-1)t_2+t_4$. The signals of waveform C shown in FIGURE 2 are amplified by the conventional power amplifier 34 and then fed to the transducer 36 suitably coupled to the medium through which the message is to be transmitted.

Figure 3:
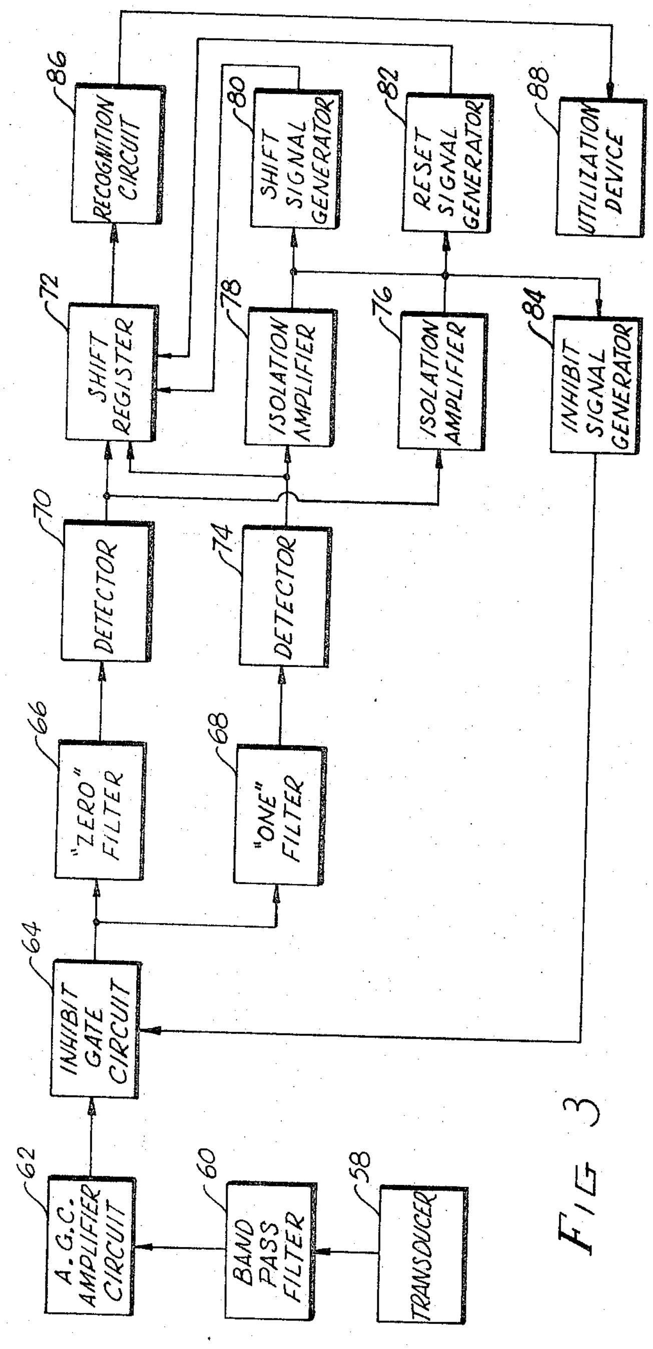
FIGURE 3 is a block diagram showing the receiver of the signaling system of the present invention.

Reference is made to FIGURE 3 wherein there is shown the receiver of the present invention. The numeral 58 designates a transducer suitably coupled to the transmission medium for receiving the code message. Transducer 58 is connected through a band-pass filter 60 and AGC amplifier circuit 62 to an inhibit gate circuit 64.

Figure 4:
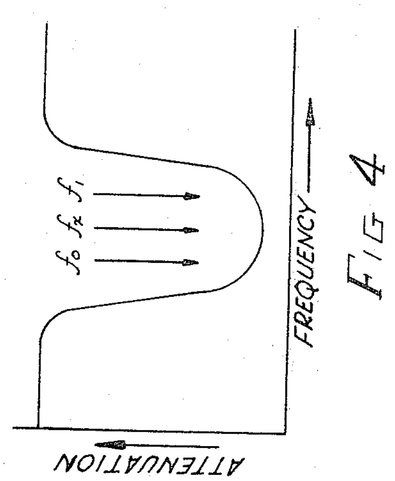
FIGURE 4 is a graph showing the relationship of signal attenuation versus frequency curve of a band-pass filter utilized in the present invention.

Band-pass filter 60 is adapted to pass only signals within the frequency band $f_0$, $f_x$, and $f_1$. FIGURE 4 shows the attenuation versus frequency curve of such a band-pass filter.

Figure 5:
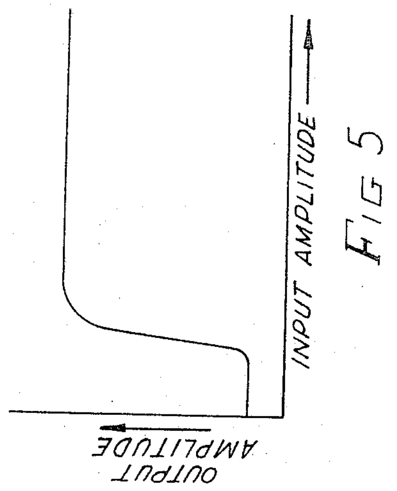
FIGURE 5 is a graph showing a curve relating the output amplitude versus the input amplitude of signals to and from an automatic gain control circuit utilized in the practice of this invention.

AGC amplifier circuit 62 serves to provide an output signal that is constant in intensity for any input level above an arbitrary low value. This characteristic is illustrated in FIGURE 5 wherein there is shown the curve relating the output amplitude versus the input amplitude of signals to and from the AGC circuit 62. It will be noted from FIGURE 5 that the circuit 62 has an output which is for low input signals, begins at some particular input amplitude threshold, and attains a constant value which is maintained for any input signal above that threshold. The small and constant output amplitude for input signals near zero reflects the fact that in this state the AGC circuit 62 has maximum gain and the output signal is a mixture of circuit noise and ambient noise in the communication medium.

Inhibit gate circuit 64 is such that when no inhibit signal is applied thereto it provides substantially zero signal attenuation, but with an inhibit signal applied, it provides very large signal attenuation, as hereinafter will be more fully described.

Connected in parallel to inhibit gate circuit 64 are a "Zero" filter 66 and a "One" filter 68. The "Zero" and "One" filters 66 and 68 serve to pass only the "Zero" and "One" signal frequencies $f_0$ and $f_1$, respectively, and eliminate all others including the X signal frequency $f_x$.

"Zero" filter 66 is connected through detector 70 to provide shift register 72 with a "Zero" signal. Similarly the "One" filter 68 is connected through detector 74 to supply shift register 72 with a "One" signal input. Both detectors 70 and 74 could be conventional diodes, for example.

The shift register 72 is conventional and consists of a series of stages of bi-stable coupled circuits which could be flip-flops. Each stage has two stable states ordinarily identified as "Zero" and "One." The shift register 72 need only be of the type that has input means for accepting the "Zero" and "One" bits of a binary coded message, and also with capability for accepting separate signals to shift the register, and to reset or clear the register of stored messages and prepare it for the storing of another message. The shift register 72 of the present invention has six stages. It is to be understood that the shift register could have more stages, the number of stages being equal to the number of binary message bits to be generated and stored.

The outputs of detectors 70 and 74 are connected respectively through isolation amplifiers 76 and 78 to a parallel arrangement of a shift signal generator 80, a reset signal generator 82, and an inhibit signal generator 84.

Isolation amplifiers 76 and 78 are conventional and serve to isolate the "Zero" and "One" signal inputs of the shift register 72 from each other.

Shift signal generator 80, reset signal generator 82, and inhibit signal generator 84 can be conventional multivibrators with delay circuitry incorporated therein as is well known. Shift signal generator 80 is adapted to provide the shift register 72 with a shift signal which occurs before the next meaningful signal is expected. The reset signal generator 82 serves to provide a reset signal to the shift register 72 during the interval $t_4$ (FIGURE 2). Inhibit signal generator 84 serves to provide an inhibit signal to the inhibit gate circuit 64, as will hereinafter be more fully described.

Recognition or message comparing circuit 86 can be of any well known form, it being required only that it be a device capable of recognizing the storage of the correct message in the shift register 72 and capable of producing an appropriate utilization signal to a utilization device 88 upon the receipt of a signal from the shift register 72.

Figure 2:
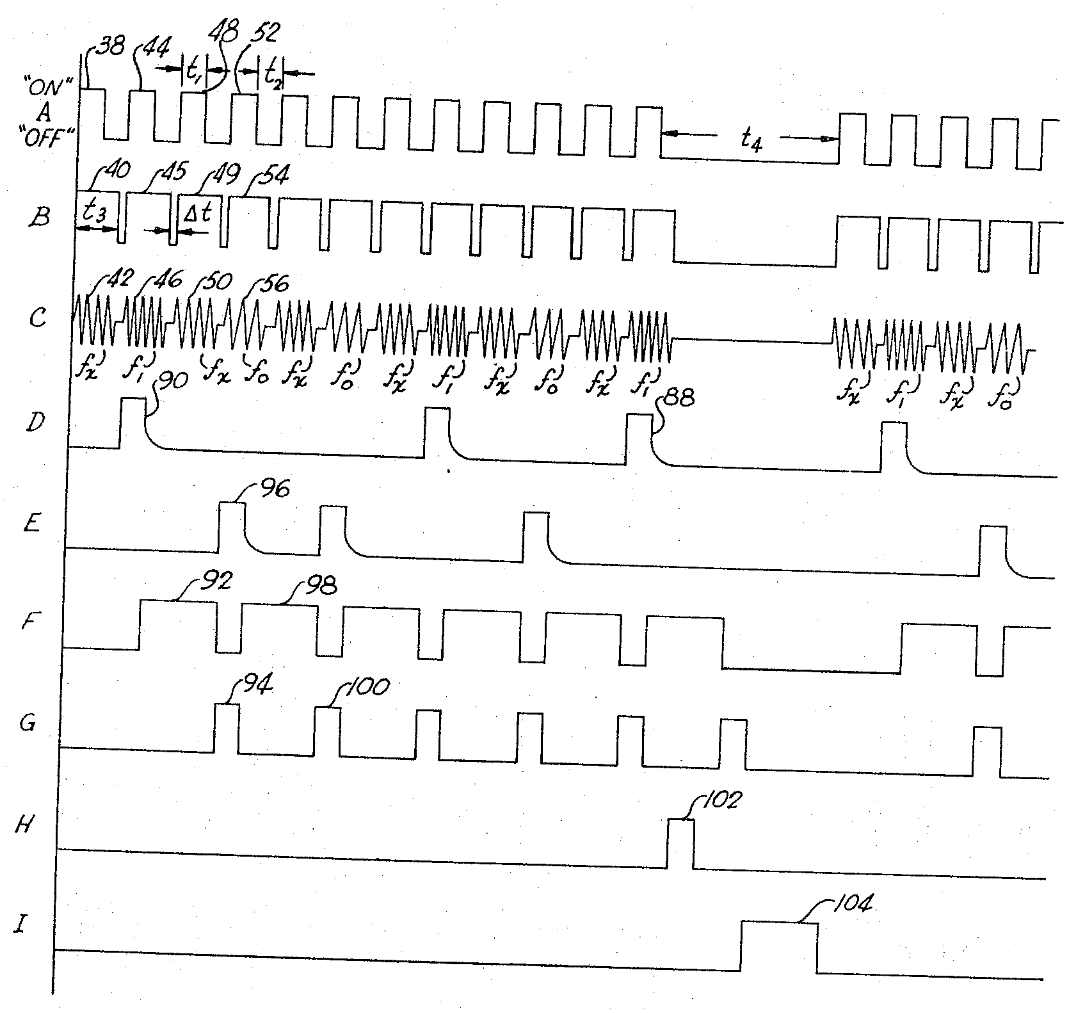
FIGURE 2 is a showing of the waveforms of signals occurring in various portions of the transmitter and receiver of the signaling system of the present invention.

In operation of the receiver assume that the transmitter of the present invention has generated and propagated through the acoustic medium the coded message as designated by the waveform C of FIGURE 2. The first bit 42 of frequency $f_x$ passes through the transducer 58, then past filter 60, AGC circuit 62 and inhibit gate circuit 64, but is eliminated by the "Zero" and "One" filters 66 and 68. Since the signal $f_x$ is of the same strength as the information bearing signals $f_1$ and $f_0$ to follow, the signal $f_x$ presets the gain of AGC circuit so that its gain is the minimum necessary to produce full output and therefore any spurious signals of lesser amplitude will not be fully amplified and will in fact be below the threshold level of the "One" and "Zero" filters 68 and 66 so that such signals will not be detected or entered in the shift register 72.

Referring again to FIGURE 2 and the waveform C the second signal bit 46 of frequency $f_1$ similarly passes through transducer 58, band-pass filter 60, AGC circuit 62, and inhibit gate circuit 64, but is allowed to pass through the "One" filter 68 to the detector 74 which produces a pulse 90 as shown in the waveform D of FIGURE 2. It is to be noted that the pulse 90 appears in the output of detector 74 shortened in duration over that of the signal bit 46. This shortening of the pulse duration of pulse 90 is due to the action of the inhibit signal generator 84 on the inhibit gate circuit 64, as will hereinafter be more fully described. The pulse 90 after it leaves detector 74 is applied to the "One" signal input of shift register 72 wherein it is entered as a "One" in the first stage of the shift register. The "One" pulse 90 also passes through isolation amplifier 78 to simultaneously activate the shift signal generator 80, the reset signal generator 82, and the inhibit signal generator 84.

The waveform F of FIGURE 2 illustrates the inhibit signals produced by the inhibit signal generator 84. Noting the first inhibit signal 92 produced in response to the "One" signal pulse 90 it can be seen that the inhibit signal 92 starts shortly after the "One" signal starts and ends just before the next meaningful signal is due. The inhibit signal 92 is applied to the inhibit gate circuit 64 to produce large signal attenuation resulting in a shortening of the duration of the pulse 90 and a minimizing of the chances of spurious or extraneous signals passing through the receiver. This action also restricts the transmitter to a predetermined rate of transmitting signals.

Waveform G shows the shift signals generated by the shift signal generator 80 in response to meaningful signals. The numeral 94 indicates the first shift signal which is initiated by the pulse 90 and shows it to be delayed in time until just before the next meaningful signal is due. The shift signal 94 is conveyed to the shift register 72 and serves to shift the contents of the shift register down one stage and thus prepare it to accept the next meaningful signal. Specifically shift signal 94 actuates the shift register 72 to shift the "One" signal 90 already entered in the first stage of the shift register to its second stage.

Referring again to waveform C of FIGURE 2, it can be seen that the next signal bit after the bit 46 is a signal 50 which is of a frequency $f_x$. This signal 50 passes through the transducer 58, the band-pass filter 60 and the AGC circuit 62 but does not pass through the inhibit gate circuit 64 due to the action of the inhibit signal generator 84 which has generated the inhibit signal 92 of waveform F of such duration as to prevent the passage of signal 50.

The next signal in waveform C is the signal 56 which is of frequency $f_0$ and represents the next meaningful signal. The bit 56 passes through the "Zero" filter 66 and the detector 70 and emerges as a pulse 96, shown in waveform E of FIGURE 2 and which is applied to the "Zero" signal input of shift register 72. The pulse 96 is also applied through isolation amplifier 76 to the inputs of shift signal generator 80, reset signal generator 82, and inhibit signal generator 84. As before the inhibit signal generator 84 produces a pulse 98 which activates inhibit gate circuit to shorten the duration of pulse 96 and minimize the chance of any other signals passing to the receiver. Again shift signal generator 80 generates a pulse 100 as shown in the waveform G of FIGURE 2 just before the next meaningful signal is received. The shift signal 100 actuates the shift register 72 to shift the "One" signal presently stored in stage two to stage three, and the just registered "Zero" signal from stage one to stage two; leaving stage one open to receive the next meaningful signal.

In a similar manner the rest of the meaningful signals constituting the coded message are entered into the shift register 72. The stored message is continuously compared by the recognition circuit 86 for validity. If a bit by bit identification of the received and stored message is established, an execute signal 102 is generated as shown in waveform H of FIGURE 2 to initiate actuation of the utilization device 88.

The reset signal generator 82 which has delayed generation of a signal until all the signal bits of waveforms D and E have had a chance to be entered into the shift register, now produces a pulse 104 as shown in waveform I, which resets all the stages of the shift register 72 to arbitrary states, as for example, all "Zeros." The receiver is now ready to accept and store the next transmitted coded message in a manner as hereinbefore described.

It will be appreciated that the present invention may use any digital coding system, whether binary, quaternary or higher order. It will also be appreciated that pluralities of valid messages could be accommodated by the system by the use of appropriate recognition circuits such as the circuit 86 to actuate pluralities of utilization devices such as the device 88, as desired.

Although a specific embodiment of the present invention has been described and illustrated in detail, it is to be clearly understood that the same is by illustration only; it is to be understood that the invention is not limited thereto, as many variations will be readily apparent to those versed in the art and the invention is to be given its broadest possible interpretation within the terms of the appended claims.

We claim:

1. A signaling system comprising:

a transmitter for generating both meaningless signals and meaningful signals, said meaningful signals representing the bits of a digitally coded message through a medium in a signal train of predetermined intensity, each meaningful signal being preceded by a meaningless signal;

a receiver responsive to said signals and including means for separating said meaningless signals from said meaningful signals, and a shift register for storing the meaningful signals;

control circuit means for controlling the receiver so that it is capable of receiving and storing a meaningful signal only during the interval when a meaningful signal is received and is nonresponsive thereafter until the next succeeding meaningful signal is received; and shifting means responsive to said meaningful signals for generating shift signals to shift said shift register prior to the expected arrival of a succeeding meaningful signal to said receiver.

2. A signaling system in accordance with claim 1 wherein said control circuit means is arranged to shorten the time duration of the meaningful signals and prevents spurious signals from passing through the receiver.

3. A signal system comprising:

a transmitter for generating through a medium a train of signals of predetermined intensity including alternate meaningless and meaningful signals, said meaningless signal being a different frequency than said meaningful signals, and said meaningful signals representing the bits of a digitally coded message, a receiver responsive to said signals and including means for separating said meaningless signals from said meaningful signals, and a shift register for storing the meaningful signals;

control circuit means for controlling the receiver so that it is capable of receiving and storing a meaningful signal only during the interval when a meaningful signal is received and is nonresponsive thereafter until the next succeeding meaningful signal is received; and shifting means responsive to said meaningful signals for generating shift signals to shift said shift register prior to the expected arrival of a succeeding meaningful code signal to said receiver.

4. A signaling system in accordance with claim 3 wherein said control circuit means is arranged to shorten the time duration of the meaningful signals and minimize the chance of passing spurious signals through the receiver.

5. A signaling system comprising:

a transmitter for generating through a medium a train of signals of predetermined intensity including alternate meaningless and meaningful signals, said meaningful and meaningless signals all being of a different frequency, and said meaningful signals representing the bits of a digitally coded message;

a receiver responsive to said signals and including means for separating said meaningless signals from said meaningful signals, and also including a shift register for storing said coded message, said shift register having separate input means for said different frequency meaningful signals, shift signal input means, and reset signal input means;

circuit means including signal filter means responsive to said different frequency meaningful signals for separating said meaningful signals and detection means connected to said signal filter means and to said separate input means and responsive to said separated meaningful signals for successively generating input pulses at each of said separate input means representing the bits of said coded message in said shift register;

shifting means including pulse generator means responsive to said input pulses and connected to said shift signal input means for generating delayed shift pulses to shift said shift register prior to the expected arrival of a succeeding meaningful code signal to said receiver;

resetting means including pulse generator means responsive to said input pulses and connected to said reset signal input means for generating delayed resetting pulses to reset said shift register after said message is received;

and an inhibit signal generator responsive to said input pulses and connected to an inhibiting means for shortening the time duration of said meaningful signals and preventing response to said meaningless signals.

6. A signaling system comprising:

a transmitter for generating both meaningless signals and meaningful signals, said meaningful signals representing the bits of a digitally coded message through a medium in a signal train of predetermined intensity, each meaningful signal being preceded by a meaningless signal;

a receiver responsive to said signals and including means for separating said meaningless signals from said meaningful signals, and also including a shift register for storing said coded message, said shift register having message input means, shift signal input means, and reset signal input means;

circuit means responsive to said meaningful signals and connected to said shift register message input means for successively generating input signals representing the bits of said coded message in said shift register;

shifting means responsive to said input signals and connected to said shift signal input means for generating shift signals to shift said shift register prior to the expected arrival of a succeeding meaningful signal to said receiver;

inhibit circuit means connected between said shift register and before said means for separating said meaningful signals for controlling the receiver so that it is capable of receiving and storing a meaningful signal only during the interval when a meaningful signal is received;

and resetting means responsive to said input signals and connected to said reset signal input means for generating reset signals to clear said shift register of said coded message.

7. A signaling system comprising:

a transmitter provided with automatic switching means for alternately connecting in predetermined order a plurality of generator means, so that a train of signals of predetermined intensity is formed;

said train of signals comprising meaningless and meaningful signals;

a transducer being part of said transmitter capable of generating said train of signals through a medium; said meaningful signals representing the bits of a digitally coded message;

a receiver responsive to said train of signals and including means for separating said meaningless signals from said meaningful signals;

said receiver provided with a shift register means having stages for storing said coded message and having electrically connected therewith a shift signal input means and a reset signal input means;

circuit filter means responsive to said meaningful signals and connected to said shift register means for storing said meaningful signals successively in said stages of said shift register means;

inhibit circuit means connected between said shift register and before said means for separating said meaningful signals from said meaningless signals, for controlling said receiver so that it is capable of receiving and storing a meaningful signal only during the interval when a meaningful signal is received;

and resetting means responsive to said input signals and connected to said reset signal input means for generating reset signals to clear said shift register of said coded message.

References Cited

UNITED STATES PATENTS

| | | | |
|---|---|---|---|
| 3,121,197 | 2/1964 | Irland | 325—30 |
| 3,142,802 | 7/1964 | Maure | 178—66 X |
| 3,178,643 | 4/1965 | Bachelet et al. | 325—42 |
| 3,268,862 | 8/1966 | Pettitt | 178—66 X |

RODNEY D. BENNETT, *Primary Examiner.*

RICHARD A. FARLEY, *Examiner.*